United States Patent Office 3,395,334
Patented July 30, 1968

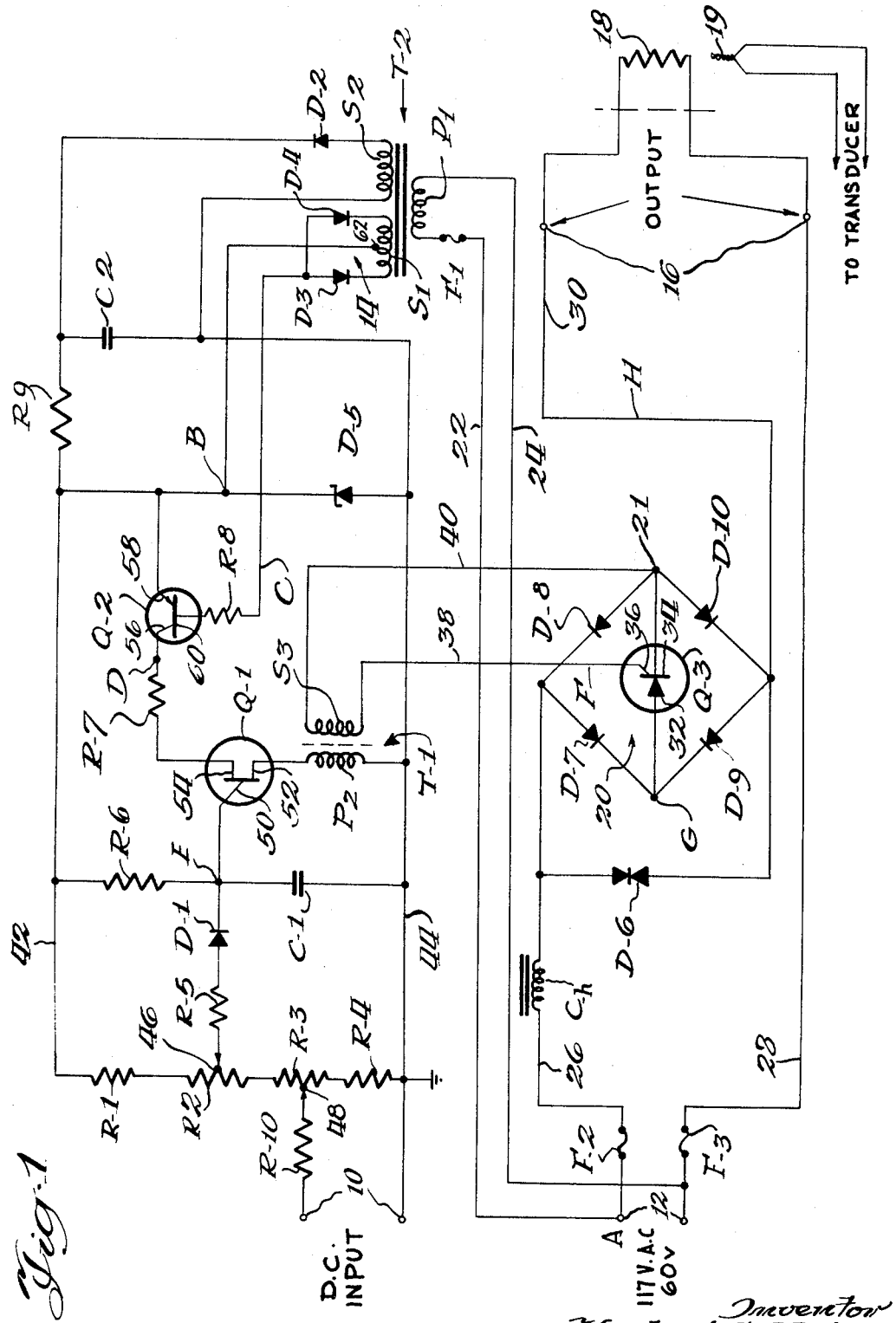

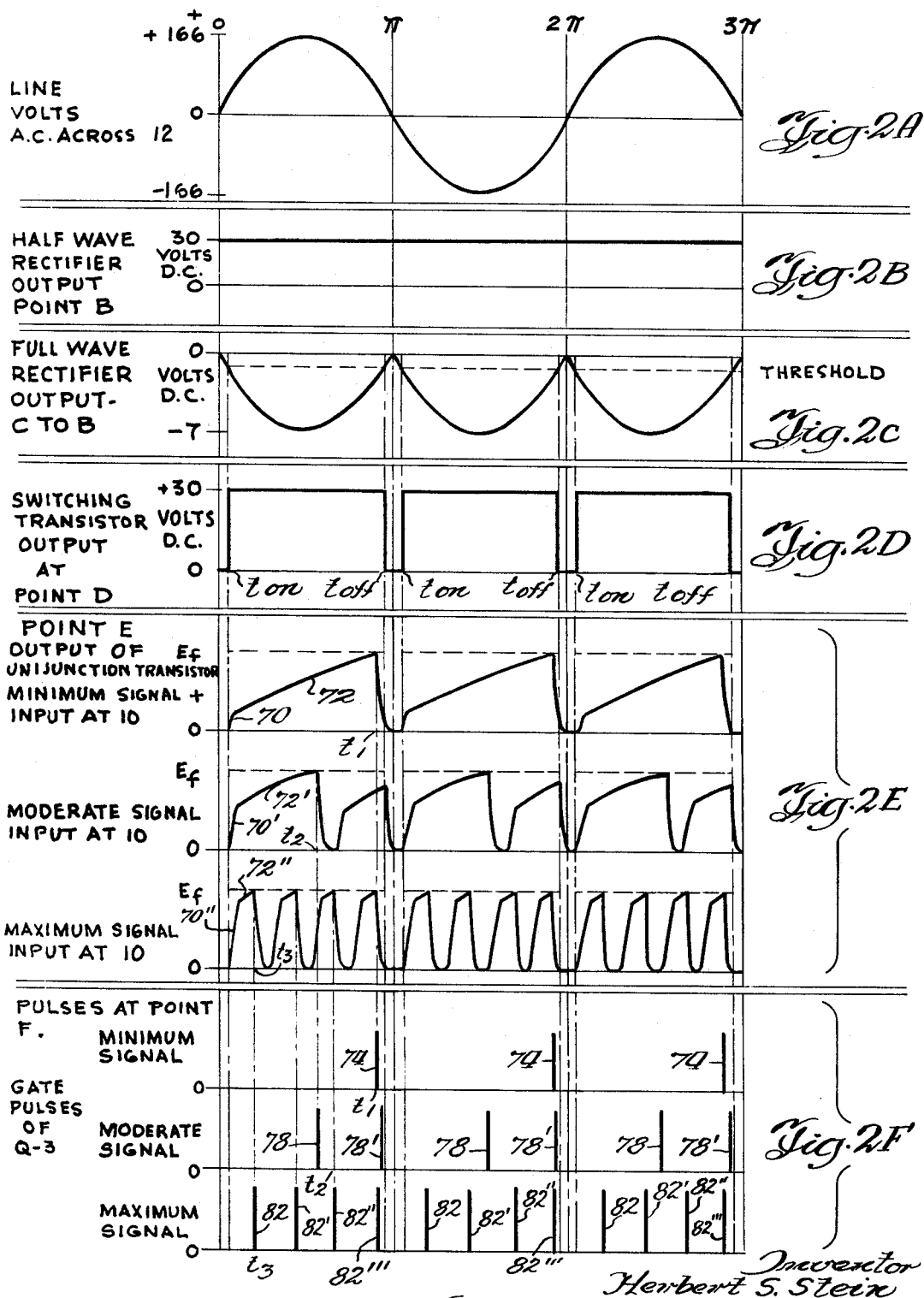

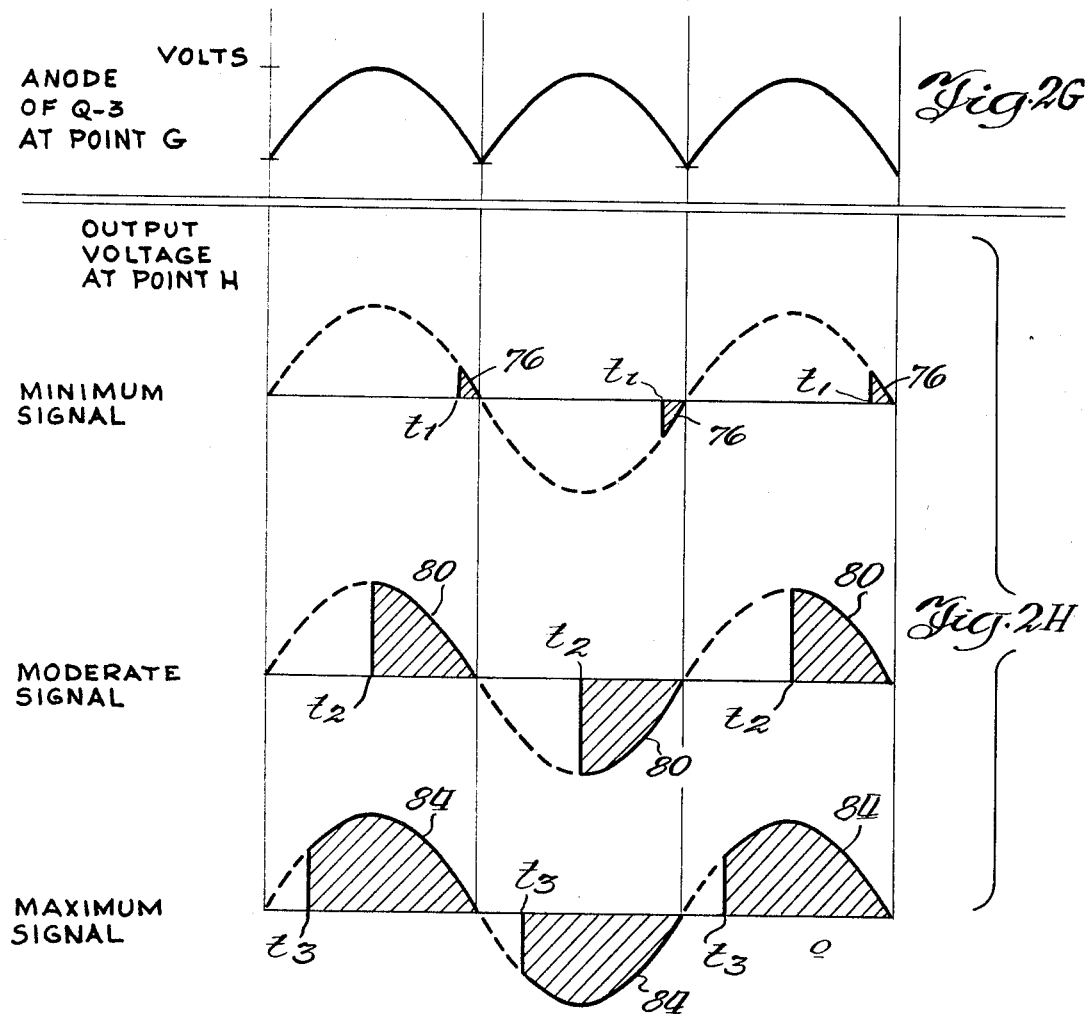

3,395,334
CONDITION RESPONSIVE POWER CONTROL CIRCUIT INCLUDING A PASSIVE ELEMENT CHARGING CIRCUIT
Herbert Samuel Stein, Chicago, Ill., assignor to Alnor Instruments Co., Division of Illinois Testing Laboratories, Inc., Chicago, Ill., a corporation of Illinois
Continuation of application Ser. No. 342,176, Feb. 3, 1964. This application June 15, 1967, Ser. No. 646,434
17 Claims. (Cl. 323—22)

ABSTRACT OF THE DISCLOSURE

An apparatus for controlling power to a load from an A.C. source in response to variations in a D.C. input which acylically triggers a controlled rectifier interposed between the A.C. source and the load; the controlled rectifier being cyclically triggered by pulsed switching means independent of the D.C. input.

---

This application is a continuation of application 342,176, filed February 3, 1964, now abandoned.

This invention relates generally to control circuits in which a signal from a transducer is applied to the circuit for controlling the power delivered from a source to a load, and more particularly is concerned with a circuit of this type in which one of the important control elements is a silicon controlled rectifier.

The environment for which the particular circuit described herein was originally intended was in connection with the operation of an industrial heating furnace, in which the transducer was a pyrometer producing a signal indicating a required reduction or increase of the heat of the furnace, and it was desired to maintain the furnace at some particular temperature. In this case, the pyrometer had a sensing device which could produce an output signal when a particular temperature was reached, a second signal when the temperature was too low, and perhaps another signal when the temperature was exceeded. This can be done by various means well known in the art. Preferably, the output varied over a critical zone of temperature. Specifically, an oscillator was energized by the movement of a meter pointer carrying a coupling member into proximity with the tank circuit of the oscillator, and the output of the oscillator was the quantity providing the control. Such a device is described in U.S. Patent 2,706,250.

The output from the pyrometer or other transducer is in the form of a low energy signal, and the control circuit is therefore required to be sensitive to such low energy signals, but must have the ability to control large amounts of power.

Since there are control devices whose general function is similar to that outlined above, the particular invention is not concerned with the performance of this function per se, but is believed novel in that it performs this function using a unique circuit which is simple, economical, and yet rugged and fool-proof in that it is made up of a small number of components arranged in an unusual manner to produce the desired results.

The achievement of this type of circuit is the primary object of the invention, but other objects are concerned with the provision of a circuit operating on a new principle utilizing pulsing waves derived from a power line for synchronizing the operation of the circuit.

Those skilled in this art will recognize other objects and advantages of the invention. In the drawings, a circuit diagram is used to illustrate a preferred embodiment of the invention, and the wave forms of the voltages in the various locations of the circuit are depicted in graphical or chart form for an aid in understanding the theory of operation of the invention. These should be considered as exemplary and not as limiting.

In the drawings:
FIG. 1 is a circuit diagram of a control circuit embodying apparatus constructed in accordance with the invention herein.

FIGS. 2A through 2H comprise voltage charts taken on the same horizontal time axis depicting the wave forms of signals in various parts of the circuit of FIG. 1 during operation of the apparatus.

Generally the invention can be described in somewhat simple language. A transducer signal input controls the first phase of the charging of a condenser at a relatively fast rate, and the second phase of the charging of the condenser is controlled by a constant potential source, the point at which the constant potential source takes over the rate of charge being determined by the amplitude of the transducer input signal. A firing circuit is provided which operates to discharge in synchronism with the line frequency in any event, but which may be fired at the same rate, but earlier in the cycle, depending upon the charge on the previously mentioned condenser. The firing circuit output is a pulse or pulses, the first of which in any half-cycle is used to gate a silicon controlled rectifier arranged in a series bridge in the output circuit applied to the load. The timing of the gating pulse in any half-cycle will control the time during that half-cycle that the silicon controlled rectifier will permit current to flow in the load. The total amount of delivered power will be a linear function of the amplitude of the transducer signal, approximately.

Looking first at the circuit of FIG. 1, several general considerations would best be pointed out initially. Bearing in mind the general statement made above, the transducer input in the form of a voltage from a thermocouple-controlled meter and associated signal-producing circuitry is applied to the circuit at 10 in the form of a D.C. voltage. In the apparatus for which the circuit was designed, the pyrometer comprised a meter having an oscillator energized by the meter pointer which produced a voltage signal that was proportional to the difference between the actual temperature measured and that desired over a limited range of the meter, approximately a few percent of the full scale of the meter. Actually the oscillator output is a current in its plate circuit which is changed to a voltage in a suitable resistor network.

This D.C. signal controls the rate of charging of the condenser C1 which in turn determines when the unijunction transistor Q1 fires in any given half-cycle. It will be seen that the unijunction transistor Q1 is controlled by a switching transistor Q2 that itself is turned on and off by the unfiltered pulsing of a full wave rectifier 14, the half waves of which are synchronized with frequency of the A.C. line 12. The A.C. line 12 connects to the output terminals 16 which are shown connected by external leads to a load, such as the heating element 18 of an electric furnace. The transducer (not shown), includes a thermocouple 19 that is in the furnace.

In one of the leads of the connection between the line 12 and the output terminals 16 there is a bridge 20 whose center leg contains the silicon controlled rectifier Q3. Unless this rectifier is conducting there will be no current flowing in the load, and, when current does flow, it will only flow during the time that Q3 is conducting. Moreover, once conduction of Q3 commences, it will stop conducting at the end of any half-cycle when the voltage between its anode and cathode drops to zero.

The firing of the unijunction transistor Q1 gates the silicon controlled rectifier during each half-cycle, and obviously the time at which the firing occurs will determine that amount of the half-cycle that the silicon controlled rectifier Q3 will permit current to flow in the load 18. Thus, if the time in the half-cycle at which the unijunction transistor Q1 fires is substantially proportional to the amplitude of the signal input, the power in the load will be substantially a linear function of the signal input over a fairly wide range.

Considering now the details of the invention, the line 12 connects by the leads 22 and 24 to the primary P1 of a power transformer T2 which has two secondary windings S1 and S2, S1 being center-tapped for full-wave rectifier connection. F1 is a fuse in the lead 22. The same line 12 connects by the leads 26 and 28 to a pair of output terminals 16, the lead 28 being a direct connection and the lead 26 having various elements in series therein. There is a bridge 20 in series in the lead 26, and there is a continuation lead 30 on the opposite side of the bridge 20 from the lead 26. The bridge 20 is made up of four diodes D7, D8, D9 and D10 all connected with their polarities arranged such that the terminal G is always positive and the opposite terminal 21 is always negative. The silicon controlled rectifier (hereinafter called SCR) Q3 has its anode 32 connected to G and its cathode 34 connected to terminal 21. Its gating electrode 36 connects by the lead 38 to the secondary S3 of a pulse transformer T1, the return lead 40 being connected to the terminal 21. F-2 and F-3 are fuses, and D-6 is a double diode to protect the bridge from line transients. Ch is an R.F. choke which may also be used for decreasing transients caused in the line by the apparatus.

The resistors R1, R2, R3 and R4 are connected in series from the positive voltage bus 42 to the negative bus 44, these forming a voltage divider, with resistors R-2 and R-3 being variable and having tapped points 46 and 48, respectively. The bus 42 is maintained at a potential of about 30 volts relative to the bus 44 which is achieved by the half wave rectifier secondary S2 and the diode D2, filtered by the condenser C2, the diode D2 being in series with a voltage dropping resistor R-9. The bus 42 and point B are maintained at a constant potential by the Zener diode D5, which in turn is protected by resistor R9.

The resistor R6 and capacitor C1 are connected in series from bus 42 to bus 44, and to their connecting midpoint E there are connected a series resistor R5 and diode D1 extending from the tap 46, and a lead extending to the emitter 50 of the unijunction transistor Q1. The first base 52 of Q1 connects through the primary winding P2 of the pulse transformer T1 to bus 44, while the second base 54 is in series with the temperature compensating resistor R-7 and connects with the collector 56 of the switching transistor Q2. The emitter 58 connects to point B while the base 60 connects through the resistor R-8 to the anodes of the diodes D3 and D4 of the full wave rectifier 14. The center tap 62 of the full wave rectifier is connected to point B.

The explanation of operation will best be followed by considering the voltage wave forms of the charts of FIGS. 2A through 2H. These are all based upon a cycle and a half of the line voltage which is shown as a sinusoidal wave at A, having a peak voltage of about 166 volts. As a result of filtering, the voltage of the bus 42 or point B is shown as an unvarying voltage of about 30 volts, in chart of FIG. 2B.

The base of the transistor Q2 receives the pulsing, unfiltered output of the full wave rectifier 14 with the base current limited by the resistor R-8, and this is a negative-going pulsed wave shown at FIG. 2C, measured from point C to point B. The transistor Q2 is thus turned on and off 120 times a second, as indicated at FIG. 2D, this being the potential at point D. The peak amplitude of the signal on the base is about 7 volts. At a value approximately $\frac{1}{10}$ of this voltage, sufficient current flows into the base of Q2 to saturate Q2 thus turning it on. When this amplitude is slightly less, Q2 is turned off. This action will establish the igniting period of the transistor Q2, since the transistor will conduct heavily as soon as the diodes pass current to establish saturation flow between the emitter 58 and base 60. The collector 56 of the transistor Q2 will be at about 30 volts when the transistor is conducting, and will be very close to zero volts otherwise. The transistor Q2 may be considered a switching transistor which turns on just after each half-cycle begins and switches off just before each half-cycle ends. The first point of time in the half-cycle is designated $t_{on}$ and the second point in time is designated $t_{off}$. These points are carried throughout the charts by vertical dot-dash lines, since they represent the critical times of firing and discontinuation of conduction of the unijunction transistor Q1.

If one examines the charts of FIGS. 2A through 2H it will become apparent that all of the events which occur in any half-cycle cannot commence until after the time $t_{on}$, so that the range of control will be dependent upon the "off" time, i.e. the period from the beginning of the half-cycle to the time $t_{on}$. There will be a similar "off" time at the end of each half-cycle. The shorter this time, the more available the remaining portion of the half-cycle for control, and the more efficient the operation of the apparatus. This follows because the apparatus depends upon synchronization, and there is a repeating pattern which occurs every half-cycle. It is desirable that the threshold of conduction voltage of the diodes D3 and D4 be as low as possible for reasons of efficiency. The use of germanium diodes provides a threshold of the order of .2 volt for a maximum "on" time and a minimum "off" time of the switching transistor Q2. Since the unijunction transistor Q1 follows the transistor Q2, a low threshold of conduction of the diodes D3 and D4 will enable the charging characteristic of the condenser C1 to commence much sooner after each half-cycle begins and continue much later than it would if the threshold of conduction of the diodes D3 and D4 was greater as in the case of silicon diodes, for example. Obviously other diodes will operate, but germanium diodes in the full wave rectifier will give greater control and, incidentally more power capability.

With the second base 54 at a voltage of 30 volts, there will be only a small current flowing through the first base 52 unless the potential of the emitter 50 relative to the base 52 exceeds a certain firing potential called "peak point" which is dependent upon the physical characteristics of the transistor Q1 and the potential between the two bases. Regardless of the potential of the emitter 50, when the time $t_{off}$ has been reached, the base 52 will conduct since the said peak point depends on the potential between bases 52 and 54. $E_f$ will actually follow the wave shape of FIG. 2D. The condenser C1 is connected across the emitter 50 and base 52, and therefore, it will always commence charging by $t_{on}$ and always discharge at $t_{off}$.

The signals from the transducer will be reduced by the series isolating resistor R10 and appear across the resistor R4 and that part of the variable resistor R3 below the tap 48. This tap adjusts the total gain of the system and determines maximum power output at maximum signal input. This voltage may be about 1 volt at 48, at a minimum signal input. The 30 volts existing across the total voltage divider R1, R2, R3 and R4 will result in another voltage at tap 46. The setting of tap 46 determines the minimum power output at minimum signal input. These two voltages combine to provide a voltage through the resistor R5 and the diode D1 for charging C1 at a relatively fast rate. The charging circuit is defined by the resistance of R3 plus R4 plus the part of R2 below 46, all in parallel with R1 plus the upper part of R2, in series with R5, if the latter is used.

Since the resistor R6 is chosen to be very much greater in resistance than any of the other named resistors, it will not affect the charging of the condenser C1 to any extent during the initial period, and hence the charging will proceed at a rapid rate at this time.

The charging curves for three conditions of input signal are shown in FIG. 2E, representing the potentials at the point E for a minimum input signal at 10, moderate input and maximum input signals, respectively from top to bottom of the chart. The charging curves at the fast rate are the portions 70, 70' and 70'' respectively. When the total voltage potential at point 46 is low, the potential of the point E need not rise very high due to charging of the condenser C1 for the diode D1 to be blocked because of reverse voltage. For higher potentials caused by higher input signals, the point E must rise correspondingly higher before the diode D1 blocks further flow of current, this being shown in the successive charts of FIG. 2E. Since the initial charging rate is faster, and the slope steeper, the voltage at point E will be carried much closer to the firing potential of the unijunction transistor Q1 for higher values of the input signal at 10.

Once the diode D1 has blocked further flow of current, the only charging path for the condenser C1 is through the high ohmage resistor R6, at a slower rate and hence with a lesser slope, as shown at 72, 72' and 72'' respectively. The charging curves in all cases are almost the same for the R6 portion of the circuit, but merely start at different voltages.

Considering first the minimum input signal condition, when the voltage of the condenser at point E reaches the firing potential $E_f$ of the unijunction transistor Q1 as shown at the broken lines of FIG. 2E, the transistor Q1 conducts suddenly and the condenser immediately discharges, giving a sharp pulse on the gate 36 of SCR Q3. This is shown at $t_1$ in chart of FIG. 2F. The condenser will probably have little or no charge when the time $t_{off}$ arrives, and hence there will probably be no additional pulse at the end of the half-cycle. This occurs with the identical pattern in each half-cycle.

Continuing with the minimum signal input condition, at FIG. 2G there is shown the voltage which exists at the anode 32 of the SCR Q3, at the point G. There would be no current flowing through the SCR unless the gate electrode 36 has received a gating signal. The gating signal represented by the pulse 74 arrives close to the end of the half-cycle, and permits the SCR Q3 to conduct, but there is only conduction for that portion of the half-cycle remaining, since the voltage across the SCR Q3 drops to zero at the end of the half-cycle.

Because of this, the voltage across the output terminals exists only at the portion of the half-cycles that the SCR Q3 conducts. This is shown at 76 in FIG. 2H representing the voltage at point H. The total power output is proportional to the square of the area subtended under the curve 76. The sine wave of line voltage is shown in broken lines to illustrate the relationship of the power curve to the whole.

Considering now the condition of moderate input signal, again there is a rising of the charge on the condenser C1 until the voltage reaches the firing voltage $E_f$, but as seen in FIG. 2E, this occurs at a time much sooner in the half-cycle than $t_1$. This is shown at $t_2$. The firing of the unijunction transistor Q1 discharges the condenser C1 and produces a sharp pulse 78 which now gates the SCR Q3 sooner than the condition previously described, so that the portion of the half-cycle during which current will flow will be greater than under the previously described condition. This is shown at 80 in FIG. 2H and obviously there will be more power supplied to the load.

Note that as soon as the condenser C1 has discharged, it starts charging again with the same pattern in the moderate signal chart, but does not quite reach $E_f$ before $t_{off}$ is reached. At this point, nevertheless, the condenser C1 must discharge, and will produce another pulse 78' near the end of the half-cycle, but the pulse 78' cannot affect the SCR Q3 because, once it has commenced conducting, its gate electrode loses control until the potential of the anode drops to zero relative to its cathode.

Considering finally the condition of a maximum signal input, the resulting charge pattern shown in FIG. 2E has the firing potential $E_f$ reached at the time $t_3$ which is quite early in the half-cycle. The resulting pulse 82 will gate the SCR Q3 to commence conducting at a corresponding early time in the half-cycle with resulting flow of current in the load and power for a greater portion of the half-cycles. This is represented by the voltage of the point H shown at 84 in chart FIG. 2H. Power output is increased accordingly.

Since the condenser C1 will commence to charge at the same fast rate, and will discharge and re-charge until the end of the cycle, there may be several pulses produced for a high input signal, as shown at 82', 82'', 82''', but none of these latter pulses will affect the output to the load for reasons already given.

A practical sample of the circuit was built and successfully tested using the following components:

| | |
|---|---|
| R1 | 3010 ohms. |
| R2 | 1500 ohms. |
| R3 | 1000 ohms. |
| R4 | 500 ohms. |
| R5 | 2200 ohms. |
| R6 | 237K ohms. |
| R7 | 240 ohms. |
| R8 | 475 ohms. |
| R9 | 4000 ohms. |
| R10 | 10K ohms. |
| C1 | .01 mfd. |
| C2 | 60 mfd. |
| D1 | Silicon diode. |
| D2 | Silicon diode. |
| D3 | Germanium diode. |
| D4 | Same. |
| D5 | Zener diode—30 volts. |
| D6 | Transient suppressor double diode. |
| D7 | Silicon diode. |
| D8 | Silicon diode. |
| D9 | Same. |
| D10 | Same. |
| Q1 | Unijunction transistor—GE 2N1671B. |
| Q2 | PNP transistor 2270. |
| Q3 | SCR 2N685. |

The remaining components are well-known and can be ascertained by those skilled in the art.

It should be noted that the values of R6 and C1 must be chosen so that in any event the slope of the characteristic 72 will carry the voltage at point E above the firing potential $E_f$ before the time $t_{off}$ is reached for a minimum input signal at 10. It is also pointed out, from a point of safety to the components, that when the transistor Q2 is cut off, it must be able to withstand a voltage of 30 volts from emitter to collector without damage. Suitable commercial transistors of this kind are available.

For proper operation of the device, D1 must be selected with due regard to the high resistance of R6 since during the blocking condition of D1 the reverse resistance of D1 is effectively in parallel with R6. The reverse resistance of D1 must therefore be very high compared with the resistance of R6, for example of the order of ten times the resistance of R6.

The voltage of the input signal at terminals 10 ranged from 10 volts D.C. to 60 volts D.C. and this was designed to control the power input to furnaces rated at 3 kw. to 11 kw.

Various modification are capable of being made without departing from the spirit or scope of the invention as defined in the attached claims. For example, the SCR Q3 and bridge 20 may be replaced by a pair of inverse parallel SCR's or a bidirectional SCR of the so-called "triac" type.

What is desired to secure by Letters Patent of the United States is:

1. A power control circuit for varying the power applied from an A.C. power source to a load proportional to an externally variable D.C. input comprising: pulsed rectifier means coupled between the A.C. power source and the load, a first switching means cyclically driven by said pulsed rectifier means, a second switching means having a plurality of terminals a first of which is operatively connected to said first switching means, said second switching means being cyclically enabled through said first switching means in synchronism with said A.C. source, controlled rectifier means series connected between said A.C. source and said load and also coupled to said second switching means to be cyclically enabled thereby to thereupon permit the delivery of power to said load during each cycle subsequent to the time said second switching means is enabled, and charging circuitry coupled between said variable D.C. input and a second and third terminal of said second switching means for acyclically enabling same proportional to said D.C. input; said charging circuitry consisting of a capacitor and a passive network coupled between said variable input and said second switching means, said charging circuitry having a charging rate defined by said D.C. variable input and said passive network to control the power to the load over its complete range, to thereby enable said controlled rectifier prior to the cyclic enabling by said second switching means and causing the delivery of power to said load for a greater period of time.

2. In an apparatus for controlling the power supplied to a load, from an A.C. power source of predetermined frequency, as a function of a D.C. signal voltage derived from an external transducer, which includes leads for connecting a controlled rectifier having gating electrode means in one of said leads; the invention consisting of a circuit for gating said controlled rectifier at a controlled time with respect to each half-cycle of the line frequency to permit the application of power to the load only for the portion of each half-cycle remaining after the gating has occurred, said gating circuit comprising: a charging circuit having passive element means for connecting said gating circuit to said external transducer and adapted to be charged exclusively through said passive means toward a predetermined potential at a rate dependent upon the amplitude of the transducer signal voltage, the constants of said charging circuit being chosen such that the rate will vary the time within a half-cycle of line frequency that the said predetermined potential will be reached; a firing circuit, including a unijunction transistor, coupled via a pulse transformer to said gating electrode means of said controlled rectifier; periodically operating switch means, including a pulsing rectifier drivingly connected to a switch element for driving the firing circuit in synchronism with line frequency to render the firing circuit conductive close to the end of each half-cycle in any event, and keeping the same conductive until close after the beginning of the following half cycle, but not affecting its conduction for the portion of each half-cycle between the periods of conductivity; said switch element being operatively connected to one base of said unijunction transistor and said charging circuit being connected between the emitter and the other base of said unijunction transistor, said predetermined potential being the firing potential at which the firing circuit will conduct independently of said switch means, the charging circuit being connected to apply its voltage to said firing circuit and to be discharged through said firing circuit but only when it conducts, whereby when the voltage on the charging circuit first reaches the firing potential after the beginning of that time in the half-cycle that the switch means has rendered the firing circuit non-conductive, the firing circuit will conduct and apply a gating signal to the controlled rectifier while discharging the charging circuit, and becoming non-conductive for the remainder of the half-cycle, if any.

3. In an apparatus for controlling the power supplied to a load from an A.C. power source of predetermined frequency as a function of a D.C. signal voltage derived from an external transducer which includes leads for connecting an SCR device having gating electrode means in one of said leads, the invention consisting of a circuit for gating said SCR device at a controlled time with respect to each half-cycle of the line frequency to permit the application of power to the load only for the portion of each half-cycle remaining after the gating has occurred and the circuit comprising: a charging circuit having passive element means connecting said circuit directly to said external transducer and including a storage condenser adapted to be charged toward a predetermined potential at a rate dependent upon the amplitude of the transducer signal voltage and said passive element means, the constants of said charging circuit being chosen such that the rate will vary the time within a half-cycle of line frequency that the said predetermined potential will be reached, a firing circuit that includes a unijunction transistor coupled to said gating electrode means of said SCR device through a pulse transformer, the condenser being connected across the input of said unijunction transistor, periodically operating switch means driving the firing circuit in synchronism with line frequency to render the firing circuit conductive close to the end of each half-cycle in any event and keeping the same conductive until close after the beginning of the following half cycle but not affecting its conduction for the portion of each half-cycle between the periods of conductivity, said switch means comprising a full wave rectifier adapted to be energized from the same source adapted to provide power to said load and a switching transistor connected with said rectifier and the unijunction transistor, said predetermined potential being the firing potential at which the firing circuit will conduct independently of said switch means, the condenser being connected to apply its voltage to said firing circuit and to be discharged through said firing circuit but only when it conducts, whereby when the charge on the condenser first reaches the firing potential after the beginning of that time in the half-cycle that the switch means has rendered the firing circuit non-conductive, the firing circuit will conduct and apply a gating signal to the SCR while discharging the condenser, and becoming non-conductive for the remainder of the half-cycle, if any.

4. A circuit as claimed in claim 3 in which said passive element means of the charging circuit has first and second parts providing a fast charge rate and a slow charge rate, respectively, the first part having means for connecting same to said transducer to produce a potential therein as a function of said D.C. signal voltage, the second part being connected with said condenser and a source of constant potential, and said passive element means further including a comparison device between the parts which blocks the first charge rate when the condenser charge reaches the potential of the first part, thereby permitting the remainder of the charge to be applied by said second part at a slow charge rate.

5. A circuit as claimed in claim 4 in which the comparison device comprises a uni-directional conducting device.

6. A control circuit of the character described for controlling power applied to a load from an A.C. power source of predetermined line frequency and which includes leads for connecting the power source to said load and having an SCR device in one of said leads, said circuit comprising a unijunction transistor having one base and its emitter coupled to the gating electrode of said SCR and a storage condenser between said one base and emitter, a switching transistor operatively connected to the other base of the unijunction transistor, a full wave pulse rectifier connected to the switching transistor to drive the same and cause the unijunction transistor to be rendered conductive as to its emitter and one base circuit for a short time at the beginning and end of each half-cycle, means for connecting the rectifier to the same A.C. power source so that the pulses of the rectifier occur in synchronism with the half waves of said source, a constant potential source, a low resistance charge network having means for connecting same to an external D.C. signal source, a high resistance charge structure, said constant potential source and condenser being connected to both said network and structure whereby the condenser may be charged through both the network and structure but at different rates and toward different potentials, the charge potential of the network being a function of the D.C. signal, a diode between the network and charge structure adapted to block the charge effect of the network after the condenser potential exceeds that of said network and thereafter permitting charge only through said structure, the circuit constants of the network, structure and condenser being such as to cause firing of the unijunction transistor and discharge of the condenser at some time prior to the end of each half-cycle determined by and linearly relate to the amplitude of the D.C. signal applied to said charge network.

7. A circuit as claimed in claim 8 in which the full wave pulse rectifier includes at least a pair of diodes of relatively low threshold of conductivity.

8. In an apparatus for varying the power applied from an A.C. source to a load in proportion to a variable D.C. input, said apparatus also including a control circuit element and leads for connecting the A.C. source to the load through the control circuit element, the invention consisting of a circuit for gating said control circuit element at a controlled time with respect to each half-cycle of the source to permit the application of power to the load only for the portion of each half-cycle remaining after the gating has occurred, said gating circuit comprising: a first switching means coupled to the A.C. source and cyclically switched thereby in synchronism therewith, second switching means having a plurality of terminals a first of which is operatively connected to said first switching means, said second switching means being cyclically enabled through said first switching means in synchronism with said A.C. source, said control circuit element also coupled to said second switching means to be cyclically enabled thereby to thereupon permit the delivery of power to said load during each cycle subsequent to the time said second switching means is enabled, and charging circuitry coupled between said variable D.C. input and a second and third terminal of said second switching means for acyclically enabling same proportional to said D.C. input said charging circuitry consisting of a passive network directly connected between said variable input and said second switching means, said passive network and variable input defining the charging rate of said charging circuitry over the complete range of power control to the load, to thereby enable said control circuit element prior to the cyclic enabling by said second switching means and causing the delivery of power to said load for a greater period of time.

9. A circuit as claimed in claim 8 in which both said switching means are transistors.

10. A circuit as claimed in claim 9 in which the collector of said first switching means is connected to a base of said second switching means.

11. A circuit as claimed in claim 8 in which said second switching means is a transistor and said second and third terminals are respectively its emitter and a base.

12. A circuit as claimed in claim 11 in which said second switching means is a unijunction transistor.

13. A circuit as claimed in claim 8 in which said passive network includes a capacitor, the rate of charging of said capacitor being independent of the operation of said first switching means.

14. A circuit as claimed in claim 8 in which said charging circuit is intercoupled with said second switching means so as to discharge therethrough during both said cyclic and said acyclic enabling thereof.

15. A circuit as claimed in claim 8 further comprising a pulsing rectifier coupled between said first switching means and the A.C. source, and a pulse transformer coupled between said second switching means and the control circuit element.

16. A circuit as claimed in claim 15 in which said first switching means is a transistor, said pulsing rectifier is connected to the base of said transistor, said second switching means is connected only to the collector of said transistor, and further comprising constant voltage means connected to the emitter of said transistor.

17. A circuit as claimed in claim 16 in which said second switching means is a double based element, one base of which is connected to the collector of said transistor, the other base of which is connected to said pulse transformer.

References Cited
UNITED STATES PATENTS

| | | | |
|---|---|---|---|
| 3,146,392 | 8/1964 | Sylvan | 323—22 |
| 3,192,462 | 6/1965 | James | 318—345 |
| 3,249,838 | 5/1966 | Mierendorf | 318—345 X |
| 3,287,663 | 11/1966 | Steen | 331—111 |
| 3,295,053 | 12/1966 | Perrins | 323—22 |
| 3,305,734 | 2/1967 | Buttenhoff | 307—88.5 |

LEE T. HIX, *Primary Examiner.*

W. H. BEHA, *Assistant Examiner.*